United States Patent Office 2,930,698
Patented Mar. 29, 1960

2,930,698

PREPARATION OF ANGEL FOOD CAKE

William E. Barch, Stamford, and Haverman P. Latham, Norwalk, Conn., and John L. Marini, New York, N.Y., assignors to Standard Brands Incorporated, New York, N.Y., a corporation of Delaware No Drawing. Application August 15, 1958
Serial No. 755,132

12 Claims. (Cl. 99—92)

This invention relates to the manufacture of angel food cake. It also relates to compositions suitable for use in the manufacture of such cake and other foods.

An object of the invention is an improved method of manufacturing angel food cake involving the use in the batter of a compound or compounds providing calcium ions and fumaric acid ions.

Another object of the invention is to provide a composition for use in foods which is capable of yielding fumaric acid ions and calcium ions.

A further object of the invention is to provide an acidifier capable of being used in continuous flow manufacturing processes for angel food cake.

A further object of the invention is to provide an egg white composition having improved whipping qualities containing a compound or compounds capable of yielding fumaric acid ions and calcium ions.

Another object of the invention is to provide an inexpensive substitute for cream of tartar for general use and for use particularly in the manufacture of angel food cake.

The quality of angel food cake is largely determined by the character of the beaten egg whites used in their preparation. To obtain optimum results the egg whites should be beaten to the so-called "wet peak." Variation from this state on either side leads to less than optimum results. If the time error is large, poor results are often obtained. The optimum beating time varies greatly with different lots of egg white and with temperature and humidity conditions. Only a highly skilled operator can judge the wet peak accurately. This is a handicap in large scale production of angel food cake of uniform day-to-day quality.

There are several methods of preparing angel food cake batter, all of which employ an acidifier such as cream of tartar in order to obtain a white cake. Any of these methods may be used in our invention. For best results it has been the practice to employ the foam method in which the egg whites are beaten to the wet peak whereupon the salt, part of the sugar and the acidifier are incorporated and the mixture is again beaten for a short time. The meringue method of preparing the cake batter involves beating the egg whites with sugar, salt and part or all of the acidifier, whereupon the rest of the ingredients are folded in. Recently a continuous flow process involving the use of high pressure low contact time mixers, like the Oakes mixer employed in the foam rubber industry, has met with success in the preparation of angel food cake. In this process all of the ingredients must necessarily be mixed together before beating. Only cream of tartar works satisfactorily as an acidifier in this process, the less expensive substitute acidifiers heretofore known failing completely. We have found that the compositions of the present invention work as well as cream of tartar in this continuous process.

In accordance with the invention, an angel food cake batter is provided at any stage in its preparation with a compound or compounds furnishing calcium ions and fumaric acid ions. If these compounds do not have the character required to adjust the pH of the cake to about 5 to about 7, sufficient edible acid is added to provide this pH.

A specific feature of the invention is the provision of a single preparation which will give the desired acidity to the cake batter as well as furnish the fumaric acid ions and the calcium ions. This acidifier may be incorporated in the egg whites before or after they are beaten with equally good results. Moreover, the cake volume obtained with this acidifier is consistently superior to that obtained with cream of tartar and there is less variation in volume between different lots of egg whites than there is with cream of tartar and other acidifiers. Egg whites containing this acidifier can be overbeaten for as much as double the optimum time with no deleterious effect on the quality of angel food cake made therefrom. The acidifier may be incorporated in liquid or dried egg whites.

The fumaric acid ion may be supplied by the free acid or any of its edible water-soluble salts, for instance, the mono- or di-alkali metal, ammonium and calcium salts. Calcium ions may be supplied by any edible acid or neutral ionizable calcium compound although a sparingly water-soluble salt is preferred. Calcium sulfate and monocalcium phosphate, either singly or in combination, are particularly desirable. There are advantages in using these salts together because the monocalcium phosphate contributes extra acidity while the calcium sulfate reduces the cost. The calcium salts of fumaric acid will, of course, supply both ions. The monocalcium salt is preferred because of its acid character. Other suitable calcium salts are, for example, the lactate, pyrophosphate, metaphosphate, gluconate, saccharate, tartrate and citrate. Starch, flour or other edible fillers may be included to give the composition desirable physical qualities such as a free-flowing quality but their use is not essential. It is desirable to choose the ingredients of the composition so that it will be equivalent in acidity to an equal weight of cream of tartar because recipes usually specify cream of tartar as the acidifier. If the compound or compounds supplying the calcium and fumaric acid ions are not sufficiently acid, the acidity may be adjusted with an appropriate amount of an edible acid, for instance, tartaric acid, citric acid, and the acid phosphates of the alkali metals.

Small amounts of the calcium and fumaric acid ions are sufficient. Satisfactory results can be obtained when the amount of fumaric acid ion is within the range from about 0.02% to about 1% based on the weight of the liquid egg white. The preferable amount is about 0.2%. While larger amounts may be used they are not advisable for reasons of economy. Also the pH of the cake should not be reduced below about 5 because it would be too acid to the taste. The amount of calcium should be at least about one half ion per ion of fumaric acid and preferably larger. The total amount of the compound or compounds supplying the calcium and fumaric acid ions should not be large enough to mechanically affect by virtue of its weight the whipping characteristics of the egg white or the baking characteristics of the flour. This amount will depend to some extent upon the composition of the salts used and will generally be about 2 or 3%.

The following are examples of compositions which supply the necessary acidity as well as calcium and fumaric acid ions, the proportions of the ingredients being such that each composition is equivalent in acidity to an equal weight of cream of tartar. Formula A is intended primarily for use in the continuous-flow process and the other formulae for the batch process. However, all of them may be used interchangeably.

|   | Fumaric Acid | Calcium Sulfate | Starch | Mono-Calcium Phosphate | Calcium Lactate | Sodium acid Pyrophosphate |
|---|---|---|---|---|---|---|
| A | 26.03 | 26.15 | 37.82 |  |  | 10.00 |
| B | 16.80 | 45.70 | 8.00 | 29.50 |  |  |
| C | 8.4 | 39.3 | 8.0 | 44.3 |  |  |
| D | 4.2 | 36.1 | 8.0 | 51.7 |  |  |
| E | 2.1 | 34.9 | 8.0 | 55.0 |  |  |
| F | 33.8 | 65.2 |  |  | 1.0 |  |
| G | 16.9 |  | 52.3 | 29.8 | 1.0 |  |
| H | 6.1 |  | 40.3 | 27.2 | 1.0 | 25.4 |
| I | 6.1 | 40.3 |  | 27.2 | 1.0 | 25.4 |

The molar ratios of fumaric acid ion and calcium ion in the foregoing formulae are as follows:

*Molar ratio*

|   | Fumaric Acid Ion | Calcium Ion |
|---|---|---|
| A | 1.00 | 0.69 |
| B | 1.00 | 2.64 |
| C | 1.00 | 5.61 |
| D | 1.00 | 11.53 |
| E | 1.00 | 23.56 |
| F | 1.00 | 1.33 |
| G | 1.00 | 1.64 |
| H | 1.00 | 45.20 |
| I | 1.00 | 91.20 |

In addition to the above compositions, our invention includes any mixture containing by weight from about 2% to 40% of fumaric acid ion and from 0.7% to 14% of calcium ion with or without any other edible materials.

Angel food cakes were prepared with these formulae and they were compared with angel food cakes prepared with cream of tartar and in some cases with angel food cakes prepared with a widely used commercial acidifier identified as substitute Y consisting essentially of monocalcium phosphate having a fused coating of sodium acid pyrophosphate. The results are given in the following table in terms of cake volume per unit of batter ingredients.

|   | Time of Beat | | | | |
|---|---|---|---|---|---|
|   | 25% under optimum | Optimum (wet peak) | 50% over optimum | 100% over optimum | 1½ Min. high speed |
| Test 1: |  |  |  |  |  |
| Formula A |  | 2,750 | 2,548 |  |  |
| Formula B |  | 2,950 | 2,760 |  |  |
| Cream of Tartar |  | 2,670 | 2,555 |  |  |
| Test 2: |  |  |  |  |  |
| Formula A |  | 2,800 | 2,415 |  |  |
| Formula B |  | 2,890 | 2,665 |  |  |
| Cream of Tartar |  | 2,750 | 2,340 |  |  |
| Test 3: |  |  |  |  |  |
| Formula B | 2,785 | 2,800 |  | 2,600 | 2,715 |
| Substitute Y | 2,645 | 2,680 |  | 2,375 | 2,695 |
| Cream of Tartar | 2,640 | 2,695 |  | 2,370 | 2,590 |
| Test 4: |  |  |  |  |  |
| Formula B |  | 2,775 |  |  |  |
| Substitute Y |  | 2,410 |  |  |  |
| Cream of Tartar |  | 2,545 |  |  |  |
| Test 5: |  |  |  |  |  |
| Formula B |  | 2,875 |  |  |  |
| Do |  | 2,930 |  |  |  |
| Do |  | 2,810 |  |  |  |
| Cream of Tartar |  | 2,780 |  |  |  |
| Test 6: |  |  |  |  |  |
| Formula B |  | 2,890 | 2,743 |  |  |
| Do |  | 2,890 | 2,787 |  |  |
| Do |  | 2,895 | 2,749 |  |  |
| Cream of Tartar |  | 2,790 | 2,682 |  |  |
| Test 7: |  |  |  |  |  |
| Formula B |  | 2,894 | 2,705 |  |  |
| Do |  | 2,890 | 2,755 |  |  |
| Do |  | 2,894 | 2,795 |  |  |
| Cream of Tartar |  | 2,762 | 2,620 |  |  |
| Do |  | 2,780 | 2,675 |  |  |
| Test 8: |  |  |  |  |  |
| Formula B |  | 2,890 | 2,770 |  |  |
| Do |  | 2,940 | 2,845 |  |  |
| Cream of Tartar |  | 2,800 | 2,530 |  |  |
| Test 9: |  |  |  |  |  |
| Formula B |  | 2,940 | 2,830 |  |  |
| Cream of Tartar |  | 2,650 | 2,625 |  |  |
| Test 10: |  |  |  |  |  |
| Formula B |  | 2,950 | 2,930 |  |  |
| Do |  | 2,990 | 2,700 |  |  |
| Do |  | 2,880 | 2,700 |  |  |
| Do |  | 2,950 | 2,780 |  |  |
| Substitute Y |  | 2,730 | 2,840 |  |  |
| Test 11: |  |  |  |  |  |
| Formula B |  | 2,753 | 2,710 |  |  |
| Formula C |  | 2,780 | 2,681 |  |  |
| Formula D |  | 2,800 | 2,638 |  |  |
| Formula E |  | 2,728 | 2,629 |  |  |
| Cream of Tartar |  | 2,670 | 2,512 |  |  |
| Test 12: |  |  |  |  |  |
| Formula F |  | 2,675 |  |  |  |
| Formula G |  | 2,745 |  |  |  |
| Formula H |  | 2,865 |  |  |  |
| Formula I |  | 2,890 |  |  |  |
| Cream of Tartar |  | 2,610 |  |  |  |

In each of these tests a different lot of egg whites was used. It will be noted that Formula B is much less sensitive to egg lot variations than either cream of tartar or substitute Y.

Each figure in the table represents the average volume of three cakes. Duplicate figures under individual tests represent repeat tests with the same egg lot.

The cakes were made by the batch method using the following standard recipe except that in the tests indicated in the last column the acidifier was added to the egg white before beating.

Beat to wet peak _____ 2 lbs. (1 qt.) egg white.
Blend together _____ 1 lb. sugar.
Beat in 1 min. _____ ¼ oz. salt, ½ oz. cream of tartar or substitute.
Sift together and fold in____ 1 lb. sugar, 12 oz. cake flour.
Bake 350–375° F. (about 30–35 min.).

Tests were also made with Formulae A and B using a continuous flow process wherein all the batter ingredients were mixed in the Oakes mixture. In this method cake quality is directly related to batter density the lightest batters producing the best cakes. In a typical run Formula A gave a batter density of 0.265 and cream of tartar 0.270. It was found that excellent angel food cake could be prepared with both formulae by this method.

Since certain changes may be made in the above process and the composition which embody the invention without departing from its spirit or scope, it is intended that all matter contained in the above description shall be interpreted as illustrative and not in a limiting sense. It is also to be understood that the following claims are intended to cover all of the generic and specific features of the invention herein described.

This application is a continuation-in-part of our co-pending application Serial No. 581,380, filed April 30, 1956, which is, in turn, a continuation-in-part of our application Serial No. 399,634, filed December 21, 1953, now abandoned.

We claim:
1. An edible acid composition comprising between about 2% and about 40% by weight of fumaric ion in the form of an edible fumaric acid compound of the group consisting of fumaric acid and water-soluble salts thereof and between about 0.7% and about 14% by weight of calcium ion in the form of an edible calcium compound of the group consisting of edible acid and neutral ionizable salts of calcium, the calcium being present in the proportion of at least about one half ion per fumaric ion, said composition containing sufficient edible acid to make it approximately equivalent in acidity to cream of tartar.

2. A composition as claimed in claim 1 wherein the calcium compound is sparingly water soluble.

3. A composition as claimed in claim 1 wherein the calcium compound is calcium sulfate.

4. A composition as claimed in claim 1 wherein the calcium compound is monocalcium phosphate.

5. A composition as claimed in claim 1 wherein the calcium compound is comprised of calcium sulfate and monocalcium phosphate.

6. An edible acid composition consisting essentially of the following ingredients in about the stated proportions:

| | Percent |
|---|---|
| Fumaric acid | 2–16 |
| Calcium sulfate | 35–46 |
| Monocalcium phosphate | 30–55 |
| Edible filler | Remainder | the acid constituents being present in an amount to make the composition approximately equivalent in acidity to cream of tartar.

7. An edible acid composition consisting essentially of about 16% fumaric acid, about 46% calcium sulfate, about 29% monocalcium phosphate and about 10% edible filler.

8. An edible acid composition consisting essentially of about 26% fumaric acid, about 26% calcium sulfate, about 10% sodium acid pyrophosphate and about 38% edible filler.

9. In a method of preparing angle food cake from egg white the step of providing in the batter at any stage of its preparation from about 0.02% to about 1%, based on the weight of liquid egg white, of fumaric acid ion in the form of an edible fumaric acid compound of the group consisting of fumaric acid and edible water-soluble salts thereof and at least one half ion of calcium per ion of fumaric acid in the form of an edible calcium compound of the group consisting of the edible acid and neutral ionizable salts of calcium, the total amount of the calcium and fumaric acid compounds not exceeding about 3% by weight of the liquid egg white.

10. A method as claimed in claim 9 wherein the fumaric acid compound is fumaric acid and the calcium compound is calcium sulfate.

11. A method as claimed in claim 9 wherein the fumaric acid compound is fumaric acid and the calcium compound is monocalcium phosphate.

12. A method as claimed in claim 9 wherein the fumaric acid compound is fumaric acid and the calcium compound is comprised of calcium sulfate and monocalcium phosphate.

References Cited in the file of this patent

UNITED STATES PATENTS

| 1,641,013 | Schneider | Aug. 30, 1927 |
| 2,222,830 | Moss | Nov. 26, 1940 |
| 2,671,730 | Finucane | Mar. 9, 1954 |
| 2,781,268 | Abbott et al. | Feb. 12, 1957 |

FOREIGN PATENTS

| 550,539 | Great Britain | June 13, 1943 |
| 552,811 | Great Britain | Apr. 27, 1943 |

OTHER REFERENCES

"Richter's Organic Chemistry," translated and revised by Speilmann, 2nd ed., 1919, vol. I (Aliphatic Series), Blukeslon's Sons & Co., p. 509.

Lowe: "Experimental Cookery," 2nd ed., 1932, John Wiley & Sons Inc., p. 372.

Mantell: "Water Soluble Gums," 1947, Reinhold Publishing Corp., pp. 141, 144.

Karrer: "Organic Chemistry," 4th Eng. ed., 1950, pp. 283, 317.

UNITED STATES PATENT OFFICE
CERTIFICATE OF CORRECTION

Patent No. 2,930,698                               March 29, 1960

William E. Barch et al.

It is hereby certified that error appears in the printed specification of the above numbered patent requiring correction and that the said Letters Patent should read as corrected below.

Column 4, line 44, for "mixture" read -- mixer --; column 5, line 31, for "angle" read -- angel --.

Signed and sealed this 20th day of September 1960.

(SEAL)

Attest:

KARL H. AXLINE
Attesting Officer

ROBERT C. WATSON
Commissioner of Patents